(No Model.) 3 Sheets—Sheet 1.
W. FARQUHARSON.
INSTRUMENT FOR MEASURING THE DISTANCE AND HEIGHT OF OBJECTS.
No. 353,127. Patented Nov. 23, 1886.
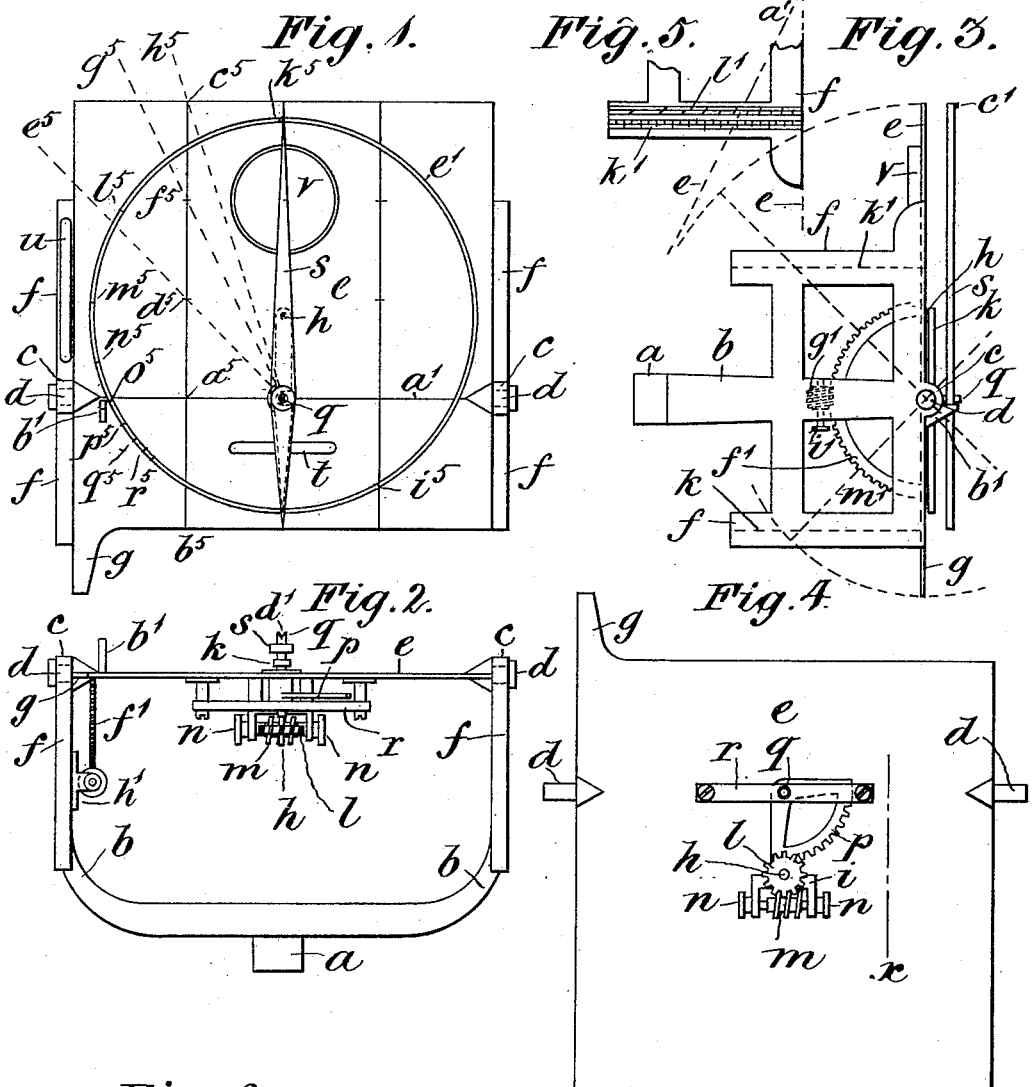
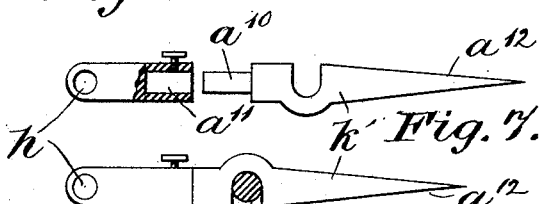
Witnesses.
Charles G. L. Simpson
W. Decain
Inventor.
W. Farquharson

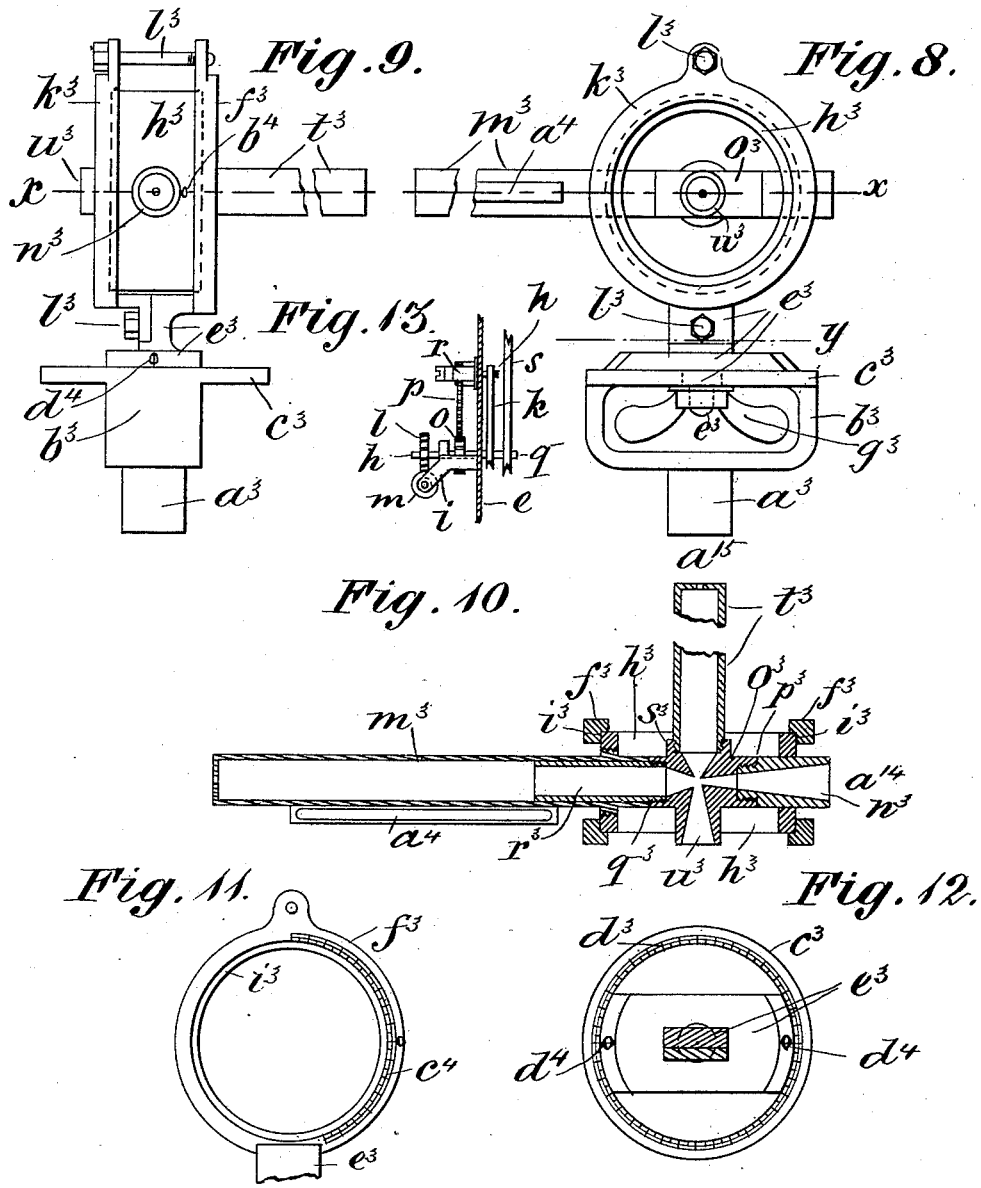

(No Model.) 3 Sheets—Sheet 3.

W. FARQUHARSON.
INSTRUMENT FOR MEASURING THE DISTANCE AND HEIGHT OF OBJECTS

No. 353,127. Patented Nov. 23, 1886.

UNITED STATES PATENT OFFICE.

WILLIAM FARQUHARSON, OF MONTREAL, QUEBEC, CANADA.

INSTRUMENT FOR MEASURING THE DISTANCE AND HEIGHT OF OBJECTS.

SPECIFICATION forming part of Letters Patent No. 353,127, dated November 23, 1886.

Application filed June 22, 1886. Serial No. 205,877. (No model.)

*To all whom it may concern:*

Be it known that I, WILLIAM FARQUHARSON, of the city of Montreal, in the district of Montreal, Province of Quebec, Canada, have invented new and useful Improvements in Instruments for Measuring the Distances and Vertical Heights of Objects; and I do hereby declare that the following is a full, clear, and exact description of the same.

This invention has reference to the construction and arrangement of two instruments which, when used together in the manner hereinafter described, will enable the distance from a given point to the object to be read off from a graduated circle on one of the instruments. They will also enable the distance between two distant objects to be estimated with great accuracy; also the vertical height above or below a datum or level line, consequently the difference of height between the distant positions and their relative elevations above or below the point at which the sight is taken.

For clearness and shortness, I wish to establish in this specification the meaning of certain words and phrases, which are as follows: One of the instruments I am about to describe I shall call the "distancer," and this name is applicable because by it the distance between points is obtained. The other instrument I shall call the "cross-staff," because its principal function, although it has others, is that of a cross staff. The front of the distancer is the lower side of Figure 1, or that upon which the person stands when taking a sight. The opposite side thereto is the back. The right-hand side of Fig. 1 is the right side of the distancer, and the opposite side thereto is the left. With regard to the cross-staff, the end in Fig. 10 at $a^{14}$ I call the "front" end. The opposite end thereto I call the "back." The end at $a^{15}$ is the right side, and the end opposite thereto is the left side.

In mentioning front, back, right, and left with regard to these instruments, as hereinafter described, they will always refer to and accord with the above-established meanings.

Figure 14:
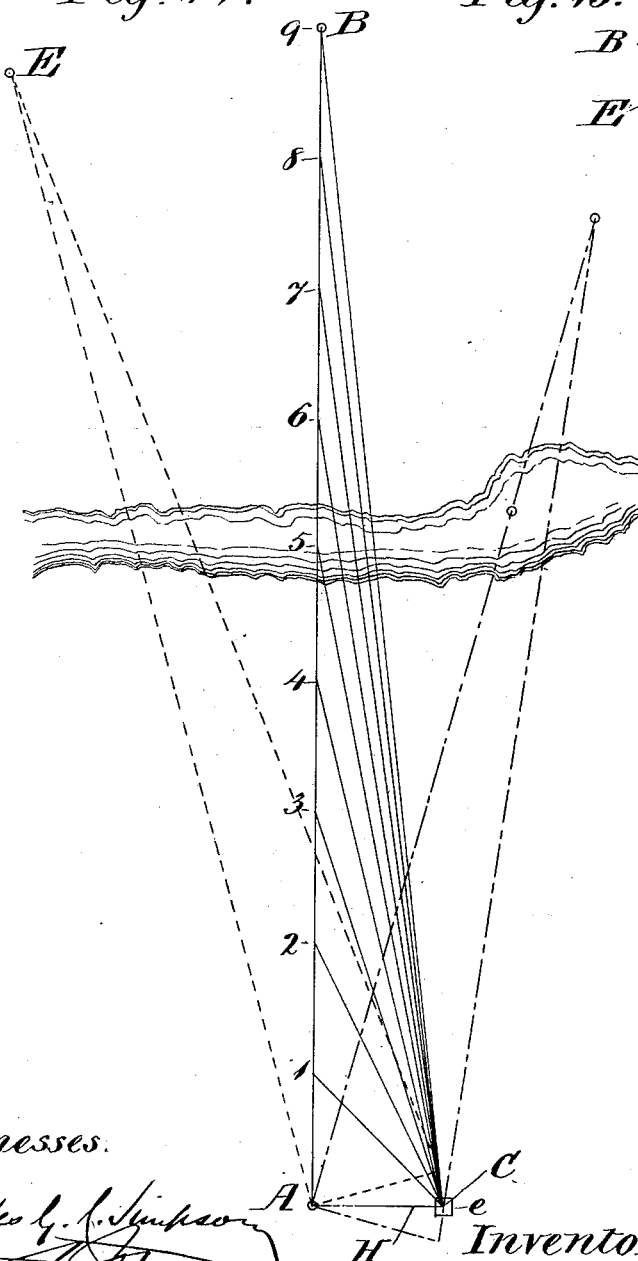
Figure 15:
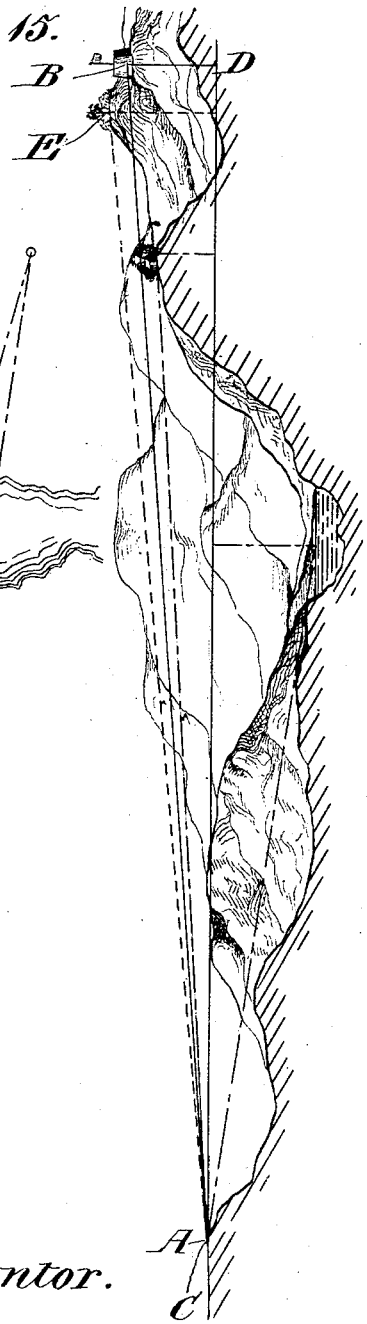

In the drawings hereunto annexed, similar letters and numerals of reference indicate like parts, and Figure 1 is a plan of the distancer. Fig. 2 is a front elevation of the distancer. Fig. 3 is a left-hand side elevation of the distancer. Fig. 4 is a plan of the table of the distancer inverted. Fig. 5 illustrates certain graduated scales on the right or inner side of the left-hand side of the frame $f$ of the distancer. Figs. 6 and 7 show details of construction of the indicating-hand of the distancer. Fig. 8 is a left-hand side elevation of the cross-staff. Fig. 9 is a front elevation of the cross-staff. Fig. 10 is a horizonal sectional plan taken on line $x$ $x$, Figs. 8 and 9, of the cross-staff. Fig. 11 is a detail of the cross-staff. Fig. 12 is a horizontal section on line $y$, Fig. 8, and plan of the base of the cross-staff. Fig. 13 is a section taken on line $x$, Fig. 4, showing a side elevation of the mechanism by which the fingers or hands of the distancer are operated. Fig. 14 is a diagram to illustrate the manner of using the distancer and cross-staff. Fig. 15 is a rough landscape view to illustrate the manner of using the distancer and cross-staff.

I will first describe the construction and arrangement of the distancer, next that of the cross staff, and lastly the manner of using them.

*The distancer.*—$a$ is a socket, similar to that of an ordinary level, which will be attached in a substantially similar manner as most levels are to parallel plates provided with adjusting-screws for leveling the instruments, and the whole is mounted on an ordinary tripod. These need not be shown, as there is no invention therein, and are such as are generally to be found in most of the levels, theodolites, and transits, &c., at present in use.

$b$ is a cross-bar, made in one with the socket $a$, the ends of which turn upward and form bearings $c$, for carrying the trunnions $d$ of a horizontal table, $e$. The ends of the cross-bar $b$, which extend upward, are each provided with extensions forming sub-frames $f$ on the right and left sides of the table $e$.

I would here remark that the forming of the frames $f$ on both sides is not absolutely necessary; yet it may be preferable, for greater accuracy of holding the table in position, to form them on both sides.

The upper surface of the table $e$ is made perfectly true, flat, and smooth, and is so situated on its trunnions $d$ that when turned to the proper position its surface and the upper surfaces of the frames $f$ will agree and be in one and the same plane. Therefore the surfaces of the side frames, $f$, are trued up also. Care must be taken to have the axes of the two trunnions $d$ in perfect line with one another and with the plane of the upper surface of the table $e$. The table $e$ is perfectly square, excepting a small projection, $g$. Through the center of the table $e$ a small spindle, $h$, passes, being carried in bearings in a bracket, $i$, and upon it is attached the indicating-hand $k$, also a worm-wheel, $l$. The bracket $i$ also carries a worm or screw, $m$, intermeshing with the wheel $l$.

$n\ n$ are milled heads for turning the screw $m$.

$o$ is a gear-wheel secured on the spindle $h$, intermeshing with the toothed segment $p$, attached on a spindle, $q$, carried by the bracket $r$. The spindle $q$ passes through the table $e$, and upon it is secured the sight-hand $s$, so that by rotating the milled heads $n$ through the above-described mechanism connected therewith the hands $k$ and $s$ are set to any desired position over the table $e$.

$t$ is a level set in the table $e$, and adjusted so that when it shows "level" the table will be level from right to left.

$u$ is a level set in one side of the frame $f$, and adjusted so that when it shows level the upper surface of the frame $f$ will be level; therefore, when the table is set fair with the upper surfaces of the frames $f$, and they are level, the table will be level also. If desired, the level $u$ may be situated in the table $e$, instead of the frame $f$; and, further and better, if desired, a level, $u$, may be secured in both the frame $f$ and table $e$.

$v$ is a compass let into the table $e$, and adjusted the north and south to agree with a line at right angles to the line $a'$, which represents the line of axis upon which the table $e$ turns.

$b'$ is a stop projecting from the table $e$, and so situated that when the sight-hand $s$ is turned to bear against it the hand will be exactly in line with the line $a'$. The sight of the hand $s$ is formed by a suitable projection, $c'$, at one extremity, and a split, $d'$, in the spindle $q$, or in any other desired ordinary manner. In fact, with regard to this, the sight-hand may consist of a telescope provided with cross-hairs in every way similar to those used in the ordinary levels, &c., which I consider to be the equivalent of the sight-hand. From the center of the table $e$, which is also the center of the spindle $h$, two circles, $e'$, are engraved upon it. These are graduated in the manner hereinafter described. The hands $s$ and $k$ will be preferably set on their respective spindles $h$ and $q$, so that when the hand $s$ is at exact right angles with the line $a'$ the hand $k$ will be parallel with it, or as shown by dotted lines in Fig. 1.

$f'$ is a toothed segment secured on the under side of the table $e$, intermeshing with a screw-threaded spindle, $g'$, carried in a bracket, $h'$, attached to the cross-bar $b$, (see Figs. 2 and 3,) the spindle $g'$ being operated by a milled head, $i'$. In fitting the spindle $g'$ and teeth of the segment $f'$ and all the bearing-surfaces, care must be taken to have them fitted tightly together, so that no lost motion will exist, although they are free to operate. This remark also applies to the above-mentioned mechanism by which the hands $s$ and $k$ are operated.

On the inner side of one of the frames $f$ lines $k'$ are drawn at right angles to the upper surface of the frames $f$, (see Figs. 3 and 5,) and at a given and known distance—such as two, three, or four inches—from the axis $a'$, upon which the table $e$ turns, these lines $k'$ are graduated into inches and suitable parts of an inch, preferably decimals. Great care must be taken with the situating of the lines $k'$ and the graduating of them, because the accuracy of all the measurements of height and depth or depressions will be influenced by any inaccuracy in this respect.

Within the line of the scale of inches $k'$, in any desired position, is engraved a line, $l'$, of degrees, by which it can be seen to what angle of inclination from "level" the table $e$ is turned to sight any elevated or depressed object. This scale of degrees is not necessary; but it is considered desirable to have it, so that the height of the object may be calculated by the angle of inclination of the table, as well as by the measurement on the scale $k'$. The projection $g$ is formed on the table $e$, so that when the table is turned to a great inclination, as indicated by the line $m'$, Fig. 3, it will be long enough to reach across the scale $k'$.

The above completes the description of the construction and arrangement of the instrument I call the "distancer," with the exception of the graduating of the circles $e'$, Fig. 1, which I reserve until I come to the description of how measurements are taken.

*The cross-staff.*—$a^3$ is a socket attached to parallel plates, provided with adjusting-screws and a tripod similarly in every respect as above mentioned for the socket $a$. This is made in one with the head $b^3$, the upper plate, $c^3$, of which is made circular, and upon it circles are engraved graduated into a scale, $d^3$, of degrees, &c., preferably round the whole circle, as shown. In the center of the plate $c^3$ an opening is formed to receive and fit closely the part of the foot $e^3$ within it. The lower extension of the foot extends to receive upon it a nut, $g^3$, by which the foot $e^3$ and frame $f^3$ may be securely clamped in the required position.

Made in one with the foot $e^3$, and extending above, as shown in Figs. 9, 10, and 11, is an annular frame, $f^3$, recessed to receive and hold in place a short cylinder, $h^3$, the recess in the frame $f^3$ being closely fitted to the cylinder, so that while it is free to turn within the recess $i^3$ there will not be any lost motion.

$k^3$ is a recessed clamping-plate, attached to the frame $f^3$ by screwed bolts $l^3$, which may be adjusted to allow the cylinder to turn with sufficient freedom and without lost motion; also, when desired, may be tightened by the bolts $l^3$ to lock the cylinder in place.

In the cylinder $h^3$ circular openings are formed, so that the axes of these two openings will be in one and the same straight line, which line will pass through the axis of the cylinder at right angles. In one of these openings is screwed a perfectly-trued tube, $m^3$, and through the other, fitting closely therewith, passes a short tube, $n^3$. Both of these connect with a center piece, $o^3$, the tube $n^3$ being screwed thereto, as shown at $p^3$, Fig. 10, and the tube $m^3$ abutting against a shoulder of the center piece, as shown at $q^3$. At $q^3$ a perfectly-trued tube, $r^3$, is screwed into the center piece, $o^3$, and is fitted closely to the tube $m^3$, so that the center piece, $o^3$, may be turned on its axis, the tubes $r^3$ and $n^3$ serving as the trunnions upon which it turns.

Through the above-mentioned parts a sight is formed to take a line directed to any distant object, and the sight must be arranged and the parts fitted so accurately that the turning of the center piece, $o^3$, and tubes $r^3$ $n^3$ will not vary the line of sight. A socket, $s^3$, is formed, as shown, in one side of the center piece, $o^3$, in which is screwed a sight-tube, $t^3$, and a projection, $u^3$, is formed on the opposite side of the center piece, $o^3$. Through these last above-mentioned parts an accurate sight at right angles to the sight through the tube $m^3$ is formed.

On one side of the tube $m^3$ a level, $a^4$, is situated, adjusted so that when the sight is level the level will show level. When it is desired to make the tube $m^3$ project from the left side of the cross-staff instead of the right, as shown in Fig. 10, it is only necessary to unscrew the tube $t^3$, turn over the center piece, $o^3$, and with it the tubes $n^3$ and $r^3$, thus bringing the projection $n^3$ to the right side of the cross-staff and again screw the tube $t^3$ into its place.

On the cylinder $h^3$ (see Fig. 9) a zero mark is formed, as shown at $b^4$, and on the inside of the frame $f^3$ a scale, $c^4$, of degrees is engraved. These should be so arranged that when the plate $c^3$ is level, also the sight and level $a^4$, the zero on the scale of degrees $c^4$ will agree with the zero-mark $b^4$. Zero marks are also formed at $d^4$ on the foot $e^3$ and at opposite points in the circle of degrees $d^3$ on the plate $c^3$.

The cross-staff and distancer, having been constructed as above described, are used in the following manner, (see Figs. 14 and 15:) I will suppose that it is simply desired to know (in the first place) the distance from the point A to a distant fort, B. At A, I situate the cross-staff with a tripod in the ordinary manner, and properly adjust it. I then turn the sight through the tube $m^3$ to line the center of the fort B, to do which the set-screws $l^3$ and clamping-plate $k^3$ are slackened sufficiently to allow the cylinder $h^3$ to turn. I next clamp the foot $e^3$ by means of the nut $g^3$, to secure the frame $f^3$ rigidly in position. I then by the cross-sight $t^3$ of the cross-staff set off a line, A C, at right angles to the line A B, and measure off the line A C to a desired length, such as fifty, one hundred, five hundred, or one thousand yards, or any other desired distance. Having thus secured the point C, I set up the distancer over it so that the spindle $q$ will be vertically over the point C. I then adjust or level the table $e$ and frames $f$, and turn it until the line $a'$ agrees with the line A C, which will be easily done by setting the sight-hand $s$ when turned to rest against the stop $b'$ and then turning the table $e$ until the hand $s$ fairly sights the cross-staff; but in cases where the points A and C are very unequal in level the setting and adjusting of the line $a'$ of the distancer to agree with the line A C may be done in the following manner: Having set up and leveled the distancer over the point C, as before, and having the hand $s$ in the position shown in Fig. 1, I turn the table $e$ until the hand $s$ agrees with the point A, which may be easily done by also inclining the table $e$ as required, which will be done by revolving the milled head $i'$, and then I set up a picket or pole (so that it will reach to the level of the band $s$) at H in the line A C. I turn the hand $s$ to rest against the stop $b'$, and turn the table $e$ round until the hand $s$ fairly sights the pole at H. I next turn the hand $s$ to the position shown in Fig. 1, and the instrument is now ready to take the distance from A to B, or any other required in the line A B or extension thereof. The sight-hand $s$ is then turned to sight the fort B by the mechanism operated by the milled heads $n$ $n$, which at the same time operates the indicating-hand $k$. The indicating-hand will by the graduations of the circles $e'$ indicate the number of times and fraction of a time that the base or line A C is contained in the perpendicular or line A B.

I would here remark that in turning the hand $s$ from the position shown in Fig. 1 to agree with the line $a'$ the hand $k$ may be compelled to describe more than a complete circle. It is therefore made in two parts, as shown in Figs. 6 and 7. The point end will ship and unship to enable this movement to be made, the projection $a^{10}$ being accurately fitted to the socket $a^{11}$, so that no variation of position of the point $a^{12}$ will occur by removing and replacing the point of the hand or by turning it over, as shown. (See Figs. 6 and 7.)

It now becomes time to explain how the graduations of the circles $e'$ are made.

At any distance in the table $e$, and on the line $a'$, take a point, $a^5$, and through it draw a line, $b^5 c^5$, at right angles to the line $a'$, and from the line $a^5 c^5$ cut off a part, $d^5 a^5$, equal to the distance $a^5$ is from the center of the spindle $q$, and draw the line $q e^5$. Thus in the right-angle triangle $q$ $a^5$ $d^5$ we have the two sides $d^5$ $a^5$ and $a^5$ $q$ equal one another. Therefore the angle at $d^5$ is equal to the angle at $q$, or forty-five degrees, and an object sighted by the hand $s$ when so set, and being in the line A B, must be equally distant from the point A in that line that the point C is from A. Again, from the line $c^5$ $b^5$ cut off other parts, $d^5 f^5$ and $f^5$ $c^5$, equal to $a^5$ $d^5$, and through the points $f^5$ and $c^5$ draw the lines $g^5$ $q$ and $h^5$ $q$. Therefore objects in the line A B, sighted by the hand $s$, when turned to agree with these lines, will be respectively at double and treble the distance that the point C is from the point A. Thus in Fig. 14 the point 1 is measured by turning the hand $s$ to an angle of forty-five degrees from the line $a'$. The positions of the points 2 and 3, Fig. 14, are obtained by turning the hand $s$ to agree with the lines $g^5 q$ and $h^5 q$, respectively, and so on for the positions 4 5 6 7 8 9, and, in fact, any desired number of positions. This turning of the hand $s$ being caused by operating the mechanism below the table $e$, as before described, also operates the indicating-hand $k$ an exaggerated amount, corresponding, as it were, on a larger scale with the movements of the hand $s$. The position obtained by setting the hand $s$ to agree with the line at $g^5$, Fig. 1, will, we will suppose, cause the hand $k$ to come to the position mark or graduation $i^5$ in the circles $e'$. When the hand $s$ is turned to agree with the line $h^5$, Fig. 1, or C 3 in Fig. 14, we will suppose that the hand $k$ will move to the mark $k^5$ in the circles $e'$, and correspondingly the marks $l^5, m^5, n^5, o^5, q^5$, and $r^5$ represent the positions of the hands $k$ and $s$ when they are set to correspond with the points up to $q$, which is B in the line A B, so that if the fort at B is fairly sighted by the hand $s$ when it is turned to such a position that the hand $k$ agrees and points exactly to the graduation $r^5$, it will be at once known that B is distant from the point A nine times the amount of the base A C. Now, if we know the base A C to be five hundred yards, the distance A B is four thousand five hundred yards.

For convenience, the graduations $i^5 k^5 l^5 m^5$, &c., will be numbered by numbers engraved upon the table $e$ to agree with the number of times that each position represents the number of lengths of the base A C in the line A B, and the distance between each of these graduations may be subdivided to represent fractional parts of the base A C.

Having obtained the distance from A to B, we will suppose that it is next required to know the difference of relative height between these two points. Having carefully adjusted the frames $f$ level, the table $e$ is then turned to sight the fort at B with the hand $s$, and the amount of inclination of the table $e$ is measured on the scale $k'$, which we will suppose to be distant four inches from the axis $a'$ (see Fig. 5) of the table $e$. Next find the length of the hypotenuse C B of the triangle A B C, Fig. 14, which is easy to do, having the length of the sides A B and A C. Then as four inches are to the number of inches contained in the hypotenuse B C, so is the amount indicated on the scale $k'$ of inclination of the table $e$ to the length of the line B D required, Fig. 15. The line A D represents a level line from the hand $s$.

In like manner the distance and height of the point E, which we will suppose to be a tree on a hill, can be obtained, and by the scale of degrees $d^5$ on the plate $c^5$ the angle B A E will be measured on the cross-staff, so that, having the length of the lines A B and E A and the angle B A E, the distance of the point E from the point B can be obtained in the ordinary manner. The relative height of the point E with regard to the point A can be obtained as before to that of the point B with regard to the point A, and from these will be found the relative heights of the points B and E as regard each other, and likewise with any distant object, and this with much greater ease and rapidity than heretofore, and without approaching near to the distant points.

I would remark that by properly arranging the position of the hand $k$ on the spindle $h$ and hand $s$ on the spindle $q$, so that the hand $k$ rests against the spindle $q$, as in the position shown in Fig. 7, the hand $s$ will be exactly at right angles to the line $a'$, and may be so set at any time by bringing the hand $k$ to this position.

The scale $c^4$ of degrees on the cross-staff (see Fig. 11) is only given so that by the inclination of the sight of the cross-staff from the level to the line of sight placed on the distant object this angle may be measured, and by the ordinary calculation the height or depth below the datum-line, as taken by the distancer in the manner hereinbefore described, may be verified, if desired; otherwise this scale is not required. The difference of height between the points A and C must be obtained and accounted for.

It will be observed that in the description above given and in the drawings hereunto annexed the base A C is laid off to the right of the point A, and that all the angles of the lines C 1 C 2, &c., are taken by turning the hand $s$ toward the left side of the distancer. (See Fig. 1.) If it is desired to lay off the base A C to the left of the point A as well as to the right, a second circle of graduations must be described on the table $e$. In this second circle, however, the graduations will be the reverse of those shown. Thus the graduation $i^5$ will be correspondingly to the left of the hand $s$, and the graduation $k^5$ correspondingly to the right of the hand $s$, and so on for all the rest of the graduations with which the table may be provided. For the purpose of providing the table with these graduations, a second circle, $e'$, will be described upon the table immediately within or without the circle $e'$ shown, and said graduations marked upon it with subdivisions, as on the circles $e'$. As before remarked, the graduations may be of any number, although only nine have been referred to.

It is evident that when the base A C is a long one, and from the nature of the ground difficult to measure by a chain or any other line, it may be measured and set off in the same manner substantially as described for measuring the distances on the line A B.

What I claim, and wish to secure by Letters Patent, is as follows:

1. The cross-staff having cross-sights, as described, in combination with the distancer having oscillating table $e$, hands $s$ and $k$, and graduated circles $e'$, substantially as described.

2. In combination with a cross-staff constructed and arranged substantially as described, the distancer having oscillating table $e$, provided with graduated circles $e'$ and level $t$, cross-bar $b$, frame $f$, having graduated scales $k'$, and level $u$, the whole constructed and arranged substantially as described.

3. In the instrument called the "distancer," the combination of cross-bar $b$, frame $f$, having level $u$ and scales $k'$, table $e$, having level $t$, and graduated circles $e'$, and trunnions $d$, hands $s$ and $k$, with a mechanism, substantially as described, for actuating the said hands, and mechanism for adjusting the table either to the level or at an inclination, the whole constructed and arranged substantially as shown and described, for the purposes set forth.

4. The combination, in the cross-staff, of the plate $c^3$, having graduated scale of degrees $d^3$, foot $e^3$, frame $f^3$, cylinder $h^3$, plate $k^3$, sight $m^3$, having level $a^4$, and cross-sight $t^3$, the whole constructed and arranged substantially as described, for the purposes set forth.

WILLIAM FARQUHARSON.

Witnesses:
 CHARLES G. C. SIMPSON,
 W. DECARIE.